(12) United States Patent
Ciou et al.

(10) Patent No.: US 10,118,255 B2
(45) Date of Patent: Nov. 6, 2018

(54) CUTTING METHOD OF A MULTILAYER STRUCTURE CONTAINING A BRITTLE LAYER

(71) Applicants: Industrial Technology Research Institute, Hsinchu (TW); Nippon Electric Glass Co., Ltd., Shiga (JP)

(72) Inventors: Jyun-Kai Ciou, Changhua County (TW); Yung-Min Hsieh, Hsinchu County (TW); Kuo-Hsin Huang, Hsinchu County (TW); Naotoshi Inayama, Shiga (JP); Takehiko Isomoto, Shiga (JP); Takahide Fujii, Shiga (JP); Chang-Ying Chen, Kaohsiung (TW)

(73) Assignees: Industrial Technology Research Institute, Hsinchu (TW); Nippon Electric Glass Co., Ltd., Shiga (JP)

( * ) Notice: Subject to any disclaimer, the term of this patent is extended or adjusted under 35 U.S.C. 154(b) by 456 days.

(21) Appl. No.: 15/086,062

(22) Filed: Mar. 31, 2016

(65) Prior Publication Data

US 2016/0288249 A1    Oct. 6, 2016

Related U.S. Application Data

(60) Provisional application No. 62/140,463, filed on Mar. 31, 2015.

(51) Int. Cl.
*B23K 26/00*    (2014.01)
*B23K 26/38*    (2014.01)
(Continued)

(52) U.S. Cl.
CPC .......... *B23K 26/38* (2013.01); *C03B 33/0222* (2013.01); *C03B 33/07* (2013.01);
(Continued)

(58) Field of Classification Search
CPC .............................. B23K 26/00; B23K 26/38
(Continued)

(56) References Cited

U.S. PATENT DOCUMENTS

| 6,592,703 B1 | 7/2003 | Habeck et al. |
| 8,168,514 B2 | 5/2012 | Garner et al. |

(Continued)

FOREIGN PATENT DOCUMENTS

| CN | 102574246 | 7/2012 |
| EP | 2698248 | 2/2014 |

(Continued)

OTHER PUBLICATIONS

"Office Action of China Counterpart Application," dated Jun. 21, 2017, p. 1-p. 6, in which the listed references were cited.

(Continued)

*Primary Examiner* — Samuel M Heinrich
(74) *Attorney, Agent, or Firm* — JCIPRNET

(57) ABSTRACT

A cutting method of a multilayer structure containing a brittle layer is provided. The cutting method includes: cutting the multilayer structure to form a cut edge; removing a material of the multilayer structure other than the brittle layer along the cut edge, wherein the material of the multilayer structure other than the brittle layer has a width ranging from 1 micron to 2 millimeter; and modifying an edge of the brittle layer remaining after removing the material of the multilayer structure other than the brittle layer by a laser beam.

22 Claims, 11 Drawing Sheets

(51) Int. Cl.
  *C03B 33/02* (2006.01)
  *C03B 33/07* (2006.01)
  *C03B 33/04* (2006.01)
  *B23K 103/00* (2006.01)

(52) U.S. Cl.
  CPC ........ *C03B 33/074* (2013.01); *B23K 2103/54* (2018.08); *C03B 33/04* (2013.01); *Y02P 40/57* (2015.11)

(58) Field of Classification Search
  USPC .................................... 219/121.67–121.72
  See application file for complete search history.

(56) References Cited

U.S. PATENT DOCUMENTS

| | | | |
|---|---|---|---|
| 8,609,229 B2 | 12/2013 | Kondo | |
| 2002/0006765 A1 | 1/2002 | Michel et al. | |
| 2008/0202167 A1 | 8/2008 | Cavallaro et al. | |
| 2009/0311497 A1 | 12/2009 | Aoki | |
| 2011/0250423 A1 | 10/2011 | Fukasawa et al. | |
| 2013/0323469 A1 | 12/2013 | Abramov et al. | |
| 2014/0036338 A1* | 2/2014 | Bareman | G02F 1/157 359/267 |
| 2014/0216108 A1 | 8/2014 | Wiegel et al. | |
| 2014/0220309 A1 | 8/2014 | Vogt et al. | |
| 2014/0263211 A1* | 9/2014 | Hassan | B23K 26/048 219/121.69 |
| 2014/0340730 A1* | 11/2014 | Bergh | B23K 26/38 359/275 |
| 2015/0191388 A1 | 7/2015 | Abramov et al. | |
| 2016/0049608 A1* | 2/2016 | Hack | H01L 51/56 257/40 |
| 2017/0008793 A1* | 1/2017 | Bankaitis | B23K 26/083 |

FOREIGN PATENT DOCUMENTS

| | | |
|---|---|---|
| JP | 2006130903 | 5/2006 |
| JP | 2013223886 | 10/2013 |
| TW | 521020 | 2/2003 |
| TW | 200909367 | 3/2009 |
| TW | I317667 | 12/2009 |
| TW | 201226093 | 7/2012 |
| TW | 201236796 | 9/2012 |
| TW | I385133 | 2/2013 |
| TW | 201321321 | 6/2013 |
| TW | I445586 | 7/2014 |
| TW | 201446498 | 12/2014 |
| WO | 2005110741 | 11/2005 |

OTHER PUBLICATIONS

"Office Action of Taiwan Counterpart Application," dated May 9, 2017, p. 1-p. 4, in which the listed references were cited.

Youngcheol Joo, et al., "Development of Five-Axis Laser Cutting System for the Tangent Cutting Solid Freeform Fabrication System," Proceedings of 2003 IEEE Conference on Control Applications, vol. 2, Jun. 23-25, 2003, pp. 1052-1057.

Lingfei Ji, et al., "Laser crack-free cutting technique for thick and dense ceramics," 2009. Cleo/Pacific Rim '09. Conference on Lasers & Electro Optics & The Pacific Rim Conference on Lasers and Electro-Optics, Aug. 31, 2009, pp. 1-2.

Simon S. Cohen, et al., "Laser-Induced Line Melting and Cutting," IEEE Transactions on Electron Devices, vol. 39, No. 11, Nov. 1992, pp. 2480-2485.

S.L. Lin, et al., "Simulation and Fabrication of Pyrex glass drilling Using $CO_2$ Laser," Proceedings of the 2010 5th IEEE International Conference on Nano/Micro Engineered and Molecular Systems, Jan. 20-23, 2010, pp. 333-336.

Chao-Ton Su, et al., "Parameter Optimization Design for Touch Panel Laser Cutting Process," IEEE Transactions on Automation Science and Engineering, vol. 9, No. 2, Apr. 2012, pp. 320-329.

* cited by examiner

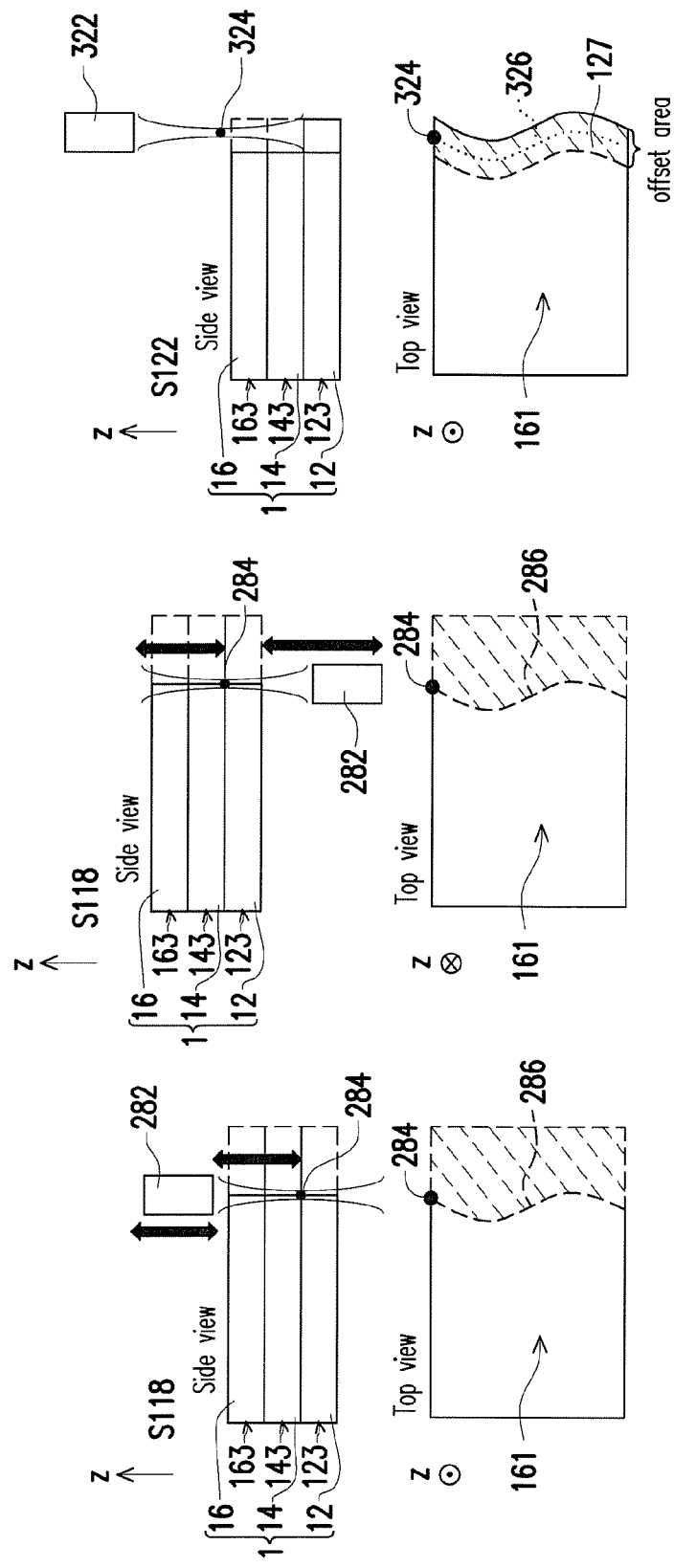

CUTTING METHOD OF A MULTILAYER STRUCTURE CONTAINING A BRITTLE LAYER

CROSS-REFERENCE TO RELATED APPLICATION

This application claims the priority benefits of U.S. provisional application Ser. No. 62/140,463, filed on Mar. 31, 2015. The entirety of the above-mentioned patent application is hereby incorporated by reference herein and made a part of this specification.

TECHNICAL FIELD

The technical field relates to a cutting method of a multilayer structure containing a brittle layer.

BACKGROUND

Cutting of a brittle material, e.g. glass, is an important subject in various technical fields, especially the field of displays or touch panels. In the past, when the thickness of a glass plate ranges from 500 microns to 700 microns, the chippings due to cutting the glass plate may be removed by mechanical polishing. However, a glass plate may be made thinner and thinner now, which accomplishes a product with a curved surface, or transmitting a glass plate by a roll-to-roll manner.

Therefore, the cutting quality of an ultra-thin glass plate has been important. However, it is hard to achieve high quality cutting of an ultra-thin glass plate because the chippings of the ultra-thin glass cannot be removed by mechanical polishing. Mechanical polishing can break the ultra-thin glass. Any conventional mechanical cutting or advanced ultrafast laser cutting cannot achieve the cutting quality of no chipping.

SUMMARY

One of exemplary embodiments provides a cutting method of a multilayer structure containing a brittle layer. The cutting method includes: cutting the multilayer structure to form a cut edge; removing a material of the multilayer structure other than the brittle layer along the cut edge, wherein the material of the multilayer structure other than the brittle layer has a width ranging from 1 micron to 2 millimeter; and modifying an edge of the brittle layer remaining after removing the material of the multilayer structure other than the brittle layer by a laser beam.

One of exemplary embodiments provides a cutting method of a multilayer structure containing a brittle layer. The cutting method includes: cutting the multilayer structure to form a cut edge; and causing a laser beam to strike an edge of the brittle layer adjacent to the cut edge so as to peel off a layer of chippings at the edge of the brittle layer. A spot of the laser beam on the brittle layer satisfies $0.5 \leq b/a \leq 2$, where a is a diameter of the spot of the laser beam on a surface of the brittle layer, and b is the distance from the center of a focus of the laser beam to the edge of the brittle layer along a direction perpendicular to a thickness direction of the brittle layer.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIGS. 4A and 4B are a schematic side views and top views showing the detail of the step S110 in FIG. 1 according to two exemplary embodiments.

FIG. 5 is a schematic side view and top view showing the detail of the step S120 in FIG. 1 according to an exemplary embodiment.

DETAILED DESCRIPTION OF DISCLOSED EMBODIMENTS

Figure 1:
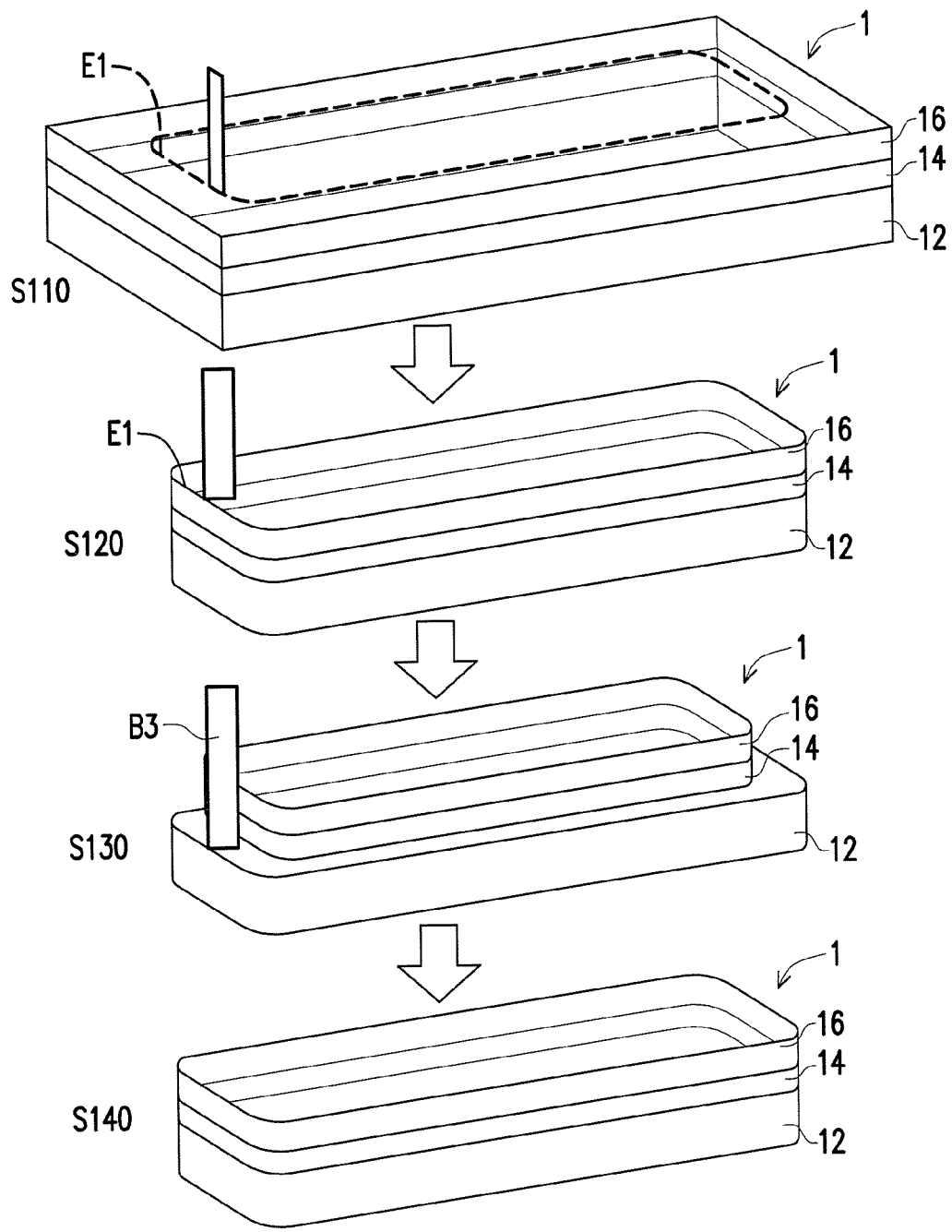
FIG. 1 is a schematic view showing steps of a cutting method of a multilayer structure containing a brittle layer according to an exemplary embodiment.

FIG. 1 is a schematic view showing steps of a cutting method of a multilayer structure containing a brittle layer according to an exemplary embodiment. Referring to FIG. 1, the cutting method in this embodiment includes the following steps. First, a step S110 is performed, which is cutting a multilayer structure 1 to fonn a cut edge E1. In this embodiment, the multilayer structure 1 contains a brittle layer 12, an adhesive layer 14, and a polymeric layer 16, and the adhesive layer 14 is disposed between the brittle layer 12 and the polymeric layer 16. In this embodiment, the brittle layer 12 is a glass layer or any other material layer whose main composition is silicon dioxide, e.g. a ceramic layer. In addition, the adhesive layer 14 is an optical clear adhesive (OCA) layer, and the polymeric layer 16 is a polyethylene terephthalate (PET) layer, for example.

Next, a step S120 is performed, which is removing a material of the multilayer structure 1 other than the brittle layer 12 along the cut edge E1. In this embodiment, removing the material of the multilayer structure 1 other than the brittle layer 12 along the cut edge E1 includes removing a material of the adhesive layer 14 and a material of the polymeric layer 16 along the cut edge E1. In this embodiment, the material of the multilayer structure 1 other than the brittle layer 12 has a width ranging from 1 micron to 2 millimeter; that is, the removed material of the adhesive layer 14 and the removed material of the polymeric layer 16 each have a width ranging from 1 micron to 2 millimeter.

After that, a step S130 is performed, which is modifying an edge of the brittle layer 12 remaining after removing the material of the multilayer structure 1 other than the brittle layer 12 by a laser beam B3. In this embodiment, modifying the edge of the brittle layer 12 by the laser beam B3 includes causing the laser beam B3 to strike the edge of the brittle layer 12 adjacent to the cut edge E1 so as to peel off a layer of chippings at the edge of the brittle layer 12. The laser beam B3 strikes at least one of a top surface and a bottom surface of the brittle layer 12, and the top surface and the bottom surface are arranged along a thickness direction of the brittle layer 12. In FIG. 1, the laser beam B3 strikes the top surface of the brittle layer 12.

In this embodiment, a spot of the laser beam B3 on the brittle layer 12 satisfies $0.5 \leq b/a \leq 2$, where a is a diameter of the spot of the laser beam B3 on a surface (the top surface or the bottom surface) of the brittle layer 12, and b is the distance from the center of a focus of the laser beam B3 to the edge of the brittle layer 12. For example, b is the distance from the center of the focus of the laser beam B3 to the edge of the brittle layer 12 along a direction parallel to the top surface or the bottom surface of the brittle layer 12, or the distance from the center of the focus of the laser beam B3 to the edge of the brittle layer 12 along a direction perpendicular to the thickness direction of the brittle layer 12. In this embodiment, a scanning path and a scanning speed of the laser beam B3 striking on the brittle layer 12 are controlled, and the laser beam B3 is allowed to complete the scanning path. In this embodiment, the scanning speed of the laser beam B3 on the surface of the brittle layer 12 ranges from 10 mm/s to 100 mm/s. Moreover, an average power of the laser beam B3 on the surface of the brittle layer 12 may range from 1 W to 50 W. In addition, a diameter of the spot of the laser beam B3 on the surface of the brittle layer 12 ranges from 50 microns to 1000 microns. In this embodiment, a wavelength of the laser beam B3 ranges from 3 microns to 12 microns. Besides, the thickness of the brittle layer 12 ranges from 1 micron to 1 millimeter.

Then, a step S140 is achieved, and in this step, a product formed by the multilayer structure 1 is accomplished. In this embodiment, a size of chippings at the edge of the brittle layer 12 formed after cutting the multilayer structure 1 (i.e. the step S110) is controlled so that a width of a layer of chippings ranges from 1 microns to 2 millimeters. Moreover, in this embodiment, a width of chippings at the edge of the brittle layer 12 formed after cutting the multilayer structure 1 (i.e. the step S110) is controlled to be smaller than twice a thickness of the brittle layer 12.

The detail of the cutting method is described as follows, for example.

In an embodiment, the bending strength of the multilayer structure 1 may arrive at 500 MPa or more. In the step S110, cutting the multilayer structure 1 may be implemented by using a knife, scissors, a dicing blade, laser or so on to cut the multilayer structure 1 so as to form a required shape, e.g. a polygon, a circle, or an irregular shape. By the aforementioned cutting step, i.e. the step S110, many chippings at the edge of the multilayer structure 1 are formed, so that the bending strength of the multilayer structure 1 is weak, and the multilayer structure 1 is not bend-proof. At this time, the bending strength of the multilayer structure 1 is less than 200 MPa, and breakage may be easy to occur after the multilayer structure 1 is bent. The step S130 of edge modification of the brittle layer 12 uses a laser process to remove the chippings at the edge of the brittle layer formed after the step S110. This method may be called a peeling method. After the steps S110 and S130, multilayer structures 1 having shapes according to various requirements and a bending strength of 500 MPa or more thereof are achieved. The combination of the cutting method may include steps S110 and S130 or include steps S110, S120, and S130.

Figure 2A:
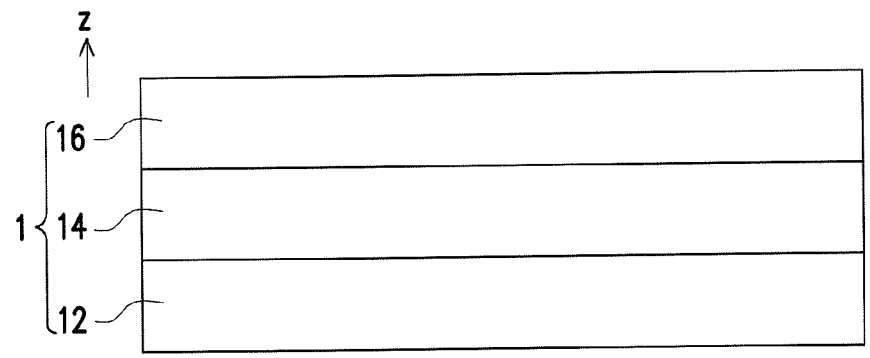
FIG. 2A is a schematic cross-sectional view of the multilayer structure in FIG. 1.
Figure 2B:
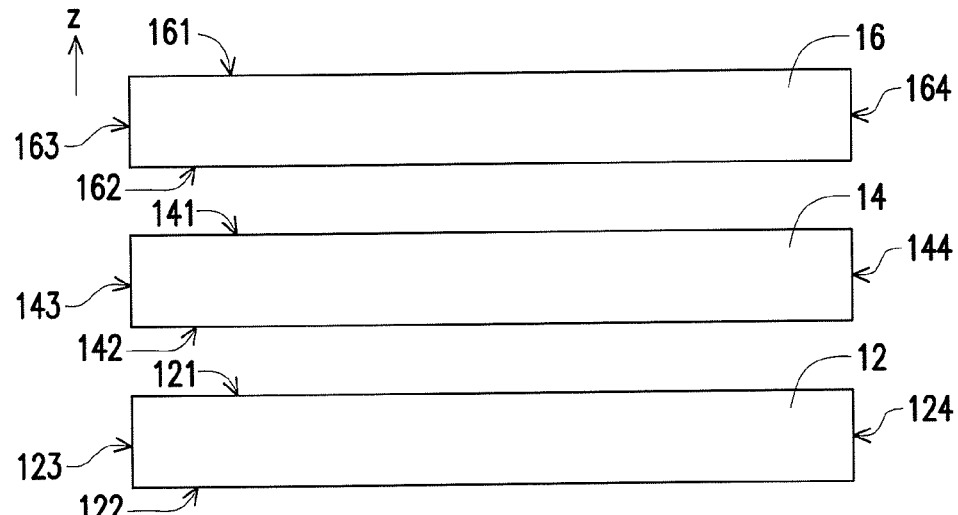
FIGS. 2B and 2C are two exploded views of the multilayer structure in FIG. 1 when viewing from two different directions, respectively.
Figure 2C:
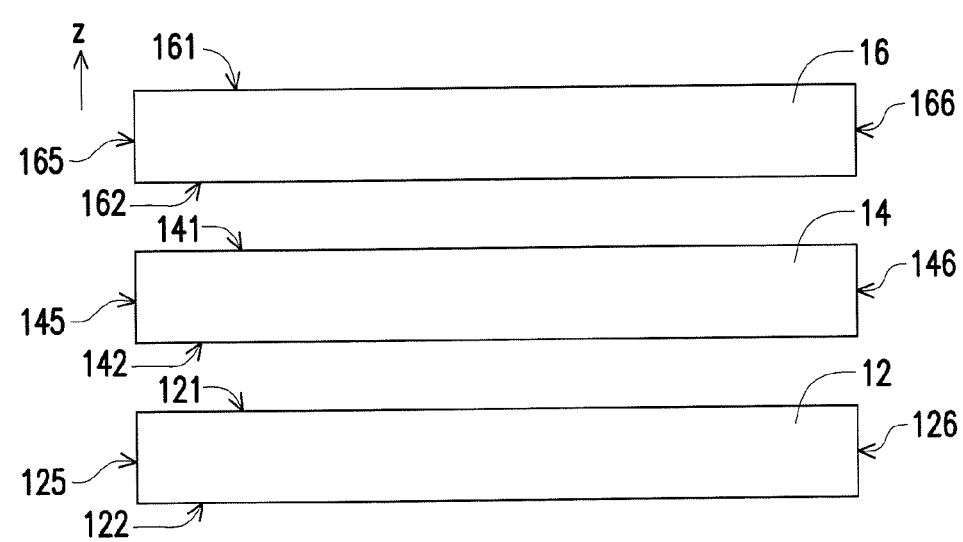

FIG. 2A is a schematic cross-sectional view of the multilayer structure in FIG. 1, and FIGS. 2B and 2C are two exploded views of the multilayer structure in FIG. 1 when viewing from two different directions, respectively. Referring to FIGS. 2A-2C, the brittle layer 12 includes a first surface 121, a second surface 122, a third surface 123, a fourth surface 124, a fifth surface125, and a sixth surface 126, wherein the thickness of the brittle layer 12 is from the first surface 121 to the second surface 122, and may ranges from 10 microns to 700 microns. The adhesive layer 14 includes a first surface 141, a second surface 142, a third surface 143, a fourth surface 144, a fifth surface 145, and a sixth surface 146, wherein when the adhesive layer 14 is, for example, an optical clear adhesive (OCA), the thickness of the adhesive layer 14 (i.e. the distance from the first surface 141 to the second surface 142) may ranges from 1 microns to 50 microns. The polymeric layer 16 includes a first surface 161, a second surface 162, a third surface 163, a fourth surface 164, a fifth surface 165, and a sixth surface 166, wherein when the polymeric layer 16 is, for example, a polyethylene terephthalate (PET) layer, the thickness of the polymeric layer 16 (i.e. the distance from the first surface 161 of the polymeric layer 16 to the second surface 162 of the polymeric layer 16) may range from 2 microns to 300 microns. In FIGS. 2A-2C, the z direction is the thickness direction of the brittle layer 12, the adhesive layer 14, and the polymeric layer 16.

Figure 3:
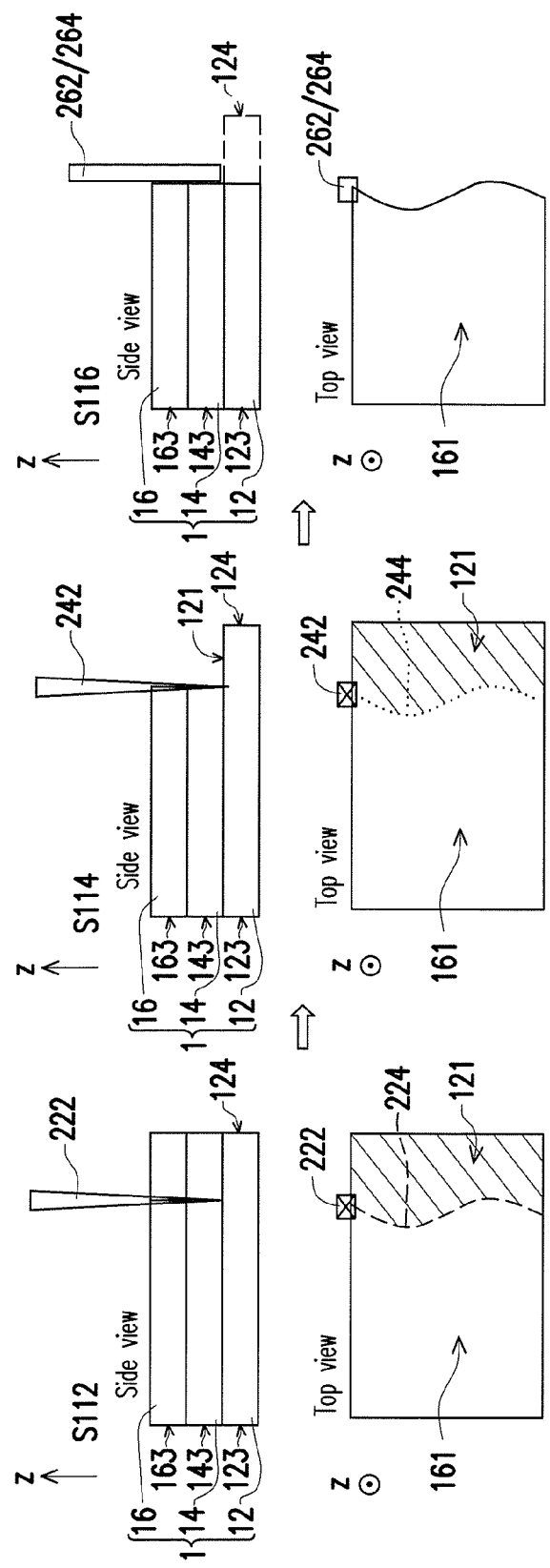
FIG. 3 is a schematic side view and top view showing detailed steps of the step S110 in FIG. 1 according to an exemplary embodiment.

FIG. 3 is a schematic side view and top view showing detailed steps of the step S110 in FIG. 1 according to an exemplary embodiment. Referring to FIG. 3, the step S110 includes sub-steps S112, S114, and S116. In the sub-step S112, a knife 222, e.g. a tungsten carbide knife, a general metal knife, etc. is used to cut the polymeric layer 16 and the adhesive layer 14. For the thickness of this embodiment, the cutting depth of the knife 222 may be controlled to be less than or equal to the total thickness of the stacked polymeric layer 16 and the adhesive layer 14, e.g., the thickness ranges from 3 microns to 350 microns. After the step S112, the polymeric layer 16 and the adhesive layer 14 are cut according to the required shape, and the brittle layer 12 remains. The process path is 224, and the brittle layer 12 is denoted by the hatched area. In the sub-step S114, a knife 242, e.g., a diamond knife, is used to notch the first surface 121 of the brittle layer 12. The path of the notch is 244, wherein the depth of the notch is about one tenth of the thickness of the brittle layer 12. In the sub-step S116, the brittle layer 12 is split by manual splitting 262 or automatic mechanism splitting 264, so that the multilayer structure 1 is cut into the required shape.

FIGS. 4A and 4B are a schematic side views and top views showing the detail of the step S110 in FIG. 1 according to two exemplary embodiments. Referring to FIGS. 4A and 4B, in this embodiment, the step S110 includes a sub-step S118, in which a laser process is used to cut the multilayer structure 1, wherein the laser source 282 may be a diode-pumped solid-state laser (DPSS) having an average power of 1 W to 100 W, a pulse width of nano-seconds or pico-seconds, and a process speed of 1 mm/s to 1000 mm/s. Alternatively, the laser source 282 may be $CO_2$ gas laser having an average power of 1 W to 300 W, a pulse width of micro-seconds, and a process speed of 1 mm/s to 1000 mm/s. When the DPSS laser source is used, the focus 284 of the laser may be moved back and forth along the z-axis direction since the depth of focus of the DPSS laser source is small; that is, the focus 284 may be located within the range of the multilayer structure 1 (e.g. the range from the second surface 122 of the brittle layer 12 to the first surface 161 of the polymeric layer 16), or located outside the range of the multilayer structure 1 wherein the focus 284 may move back and forth along the process path 286 according to a requirement, so as to achieve cutting the multilayer structure 1. If the $CO_2$ gas laser is selected, the focus 284 may be moved along the process path 286 once and may not be moved back and forth along the z-axis direction since the depth of focus of the $CO_2$ gas laser is large. Namely, the focus 284 may be located within the range of the multilayer structure 1 (e.g. the range from the second surface 122 of the brittle layer 12 to the first surface 161 of the polymeric layer 16), or located outside the range of the multilayer structure 1 wherein the focus 284 may move along the process path 286 once according to a requirement, so as to achieve cutting the multilayer structure 1. In FIG. 4A, the laser source 282 is disposed above the multilayer structure 1. However, in another embodiment, as shown in FIG. 4B, the laser source 282 may be disposed below the multilayer structure 1.

In whichever of the embodiments of FIGS. 3, 4A, and 4B, after the cutting step, i.e. the step S110, the width of edge chippings is controlled to be smaller than twice the thickness of the brittle layer 12. In an embodiment, the energy of the laser source 282 is controlled so that the width of the layer of chippings ranges from 1 microns to 2 millimeters.

FIG. 5 is a schematic side view and top view showing the detail of the step S120 in FIG. 1 according to an exemplary embodiment. Referring to FIG. 5, the step S120 includes a sub-step S122, in which a $CO_2$ gas laser process is performed, wherein the focus of the laser is within the range of the multilayer structure 1, or outside the range of the multilayer structure 1 by a distance through a defocusing method. In the sub-step S122 a $CO_2$ gas laser 322 is used to process, the focus 324 of the laser is located above the multilayer structure 1, and the focus spot is round. By defocusing, the range of the heat process by the laser process is increased. In this way, the adhesive layer 14 and the polymeric layer 16 may be selectively removed by a single process. That is, in the process, the heat provided by the laser is higher than the heat capable of cutting the adhesive layer 14 and the polymeric layer 16, but less than the heat capable of damning the brittle layer 12. As a result, there is a region, where only the brittle layer exists, formed at the edge of the multilayer structure 1, and this region is called an offset region 127 hereinafter. Moreover, by defocusing, the probability of the unexpected hot cracking of the brittle layer 12 due to too high heat transfers to the brittle layer 12 is reduced. The average power of the $CO_2$ gas laser 322 in the process ranges from 1 W to 500 W. The process speed of the $CO_2$ gas laser 322 ranges from 10 mm/s to 1000 mm/s. The process path is 326. The width of the generated offset region 127, i.e. the hatched region, ranges from 200 microns to 2000 microns.

Figure 6:
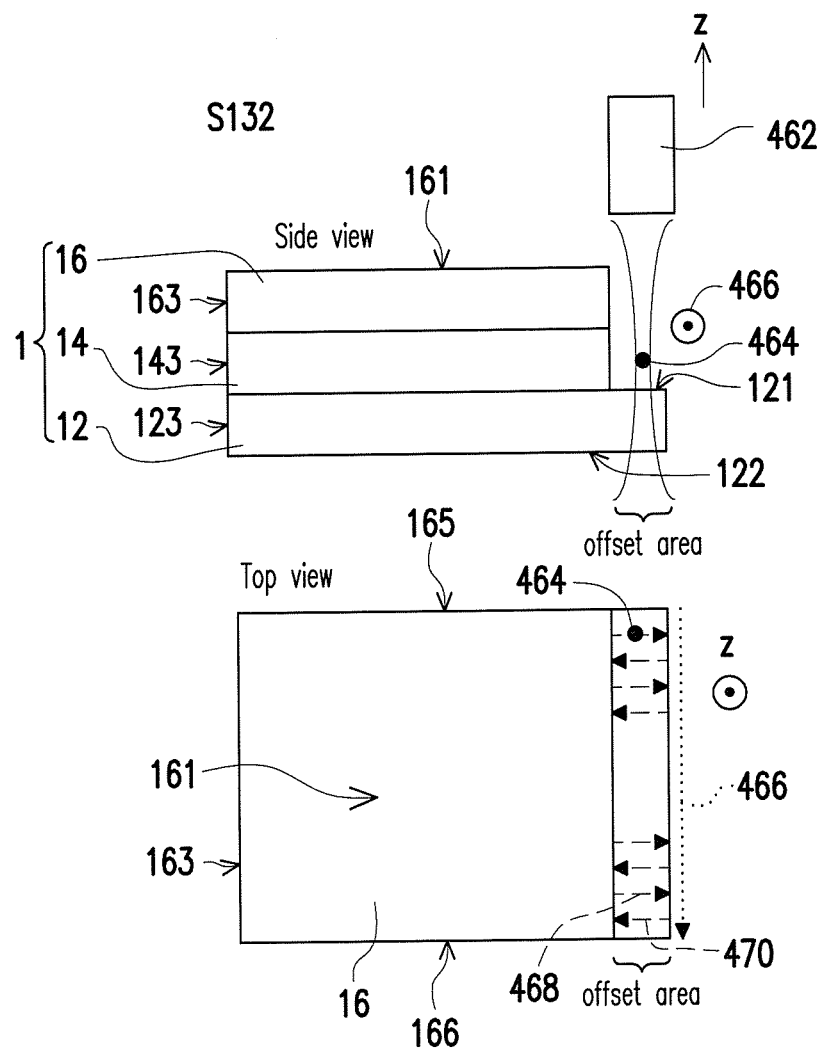
FIG. 6 is a schematic side view and top view showing the detail of the step S130 in FIG. 1 according to an exemplary embodiment.
Figure 7A:
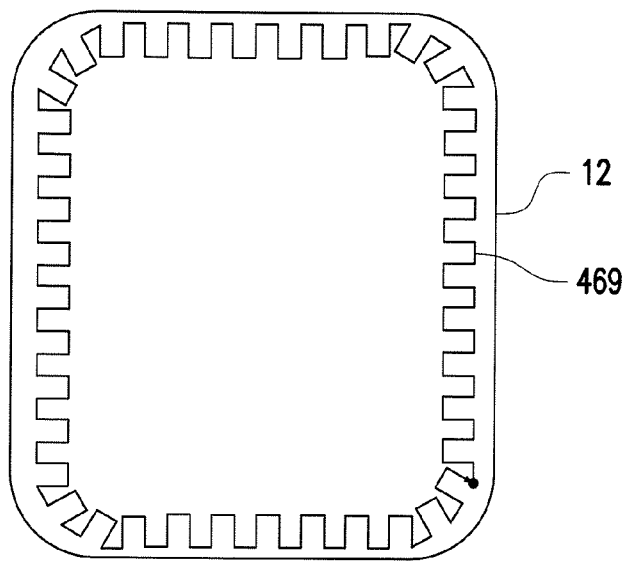
FIGS. 7A and 7B show two process paths of the laser in FIG. 6 according to two exemplary embodiment.
Figure 7B:
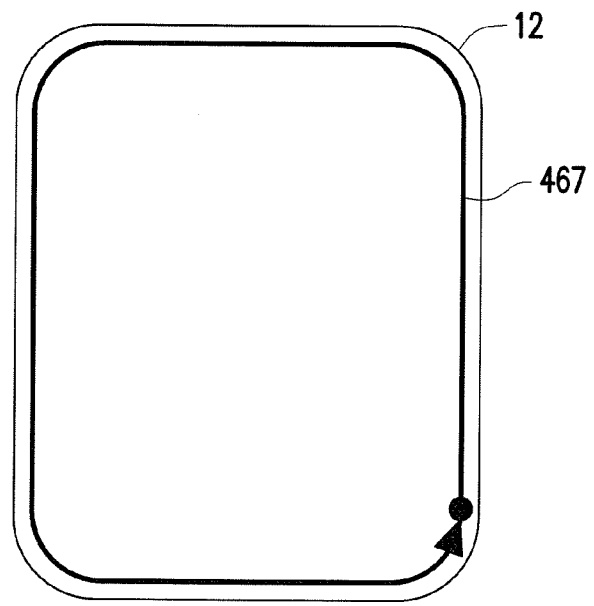

FIG. 6 is a schematic side view and top view showing the detail of the step S130 in FIG. 1 according to an exemplary embodiment. Referring to FIG. 6, the step S130 includes a sub-step S132. In this sub-step S132, the laser processing surface may be the first surface 121 or the second surface 122 of the brittle layer 12. The process path of the $CO_2$ gas laser 462 includes three types of paths 466, 468, and 470. The process may be performed along any one of the three types of paths 466, 468, and 470. Alternatively, the process may be performed along a path combining the paths 468 and 470 (e.g. the process may be performed along the path 469 shown in FIG. 7A) and performed on the offset region of the first surface 121 of the brittle layer 12, so that the chippings at the edge of brittle layer 12, including the third surface 123, the fourth surface 124, the fifth surface 125, and the sixth surface 126, are peeled by hot cracking. In another embodiment, the process may be performed along the path 467 shown in FIG. 7B. In the sub-step S132, the power of laser ranges from 10 W to 100 W, the frequency of the laser ranges from 1 kHz to 100 kHz, the scanning speed ranges from 10 mm/s to 1000 mm/s, the scanning pitch ranges from 10 microns to 100 microns, and the size of the spot of the focus 464 of the laser ranges from 50 microns to 500 microns. Moreover, the distance from the focus 464 of the laser to the surface to be processed of the brittle layer 12 (i.e. the top surface (i.e. the first surface 121) or the bottom surface (i.e. the second surface 122)) ranges from 0 mm to 20 mm. The length of the path 468 or 470 ranges from 100 microns to 10 mm. The distance from the center of the spot of the focus 464 of the laser on the path 466 to the edge of the brittle layer 12 satisfies a relationship of $0.5 \leq b/a \leq 2$, where "a" is the diameter of the spot of the laser beam on the processed surface of the brittle layer 12, and "b" is the distance between center of the focus of the laser beam and the initial cut edge of the brittle layer 12 along a direction perpendicular to the z direction (the z direction is the thickness direction of the brittle layer 12).

Figure 8:
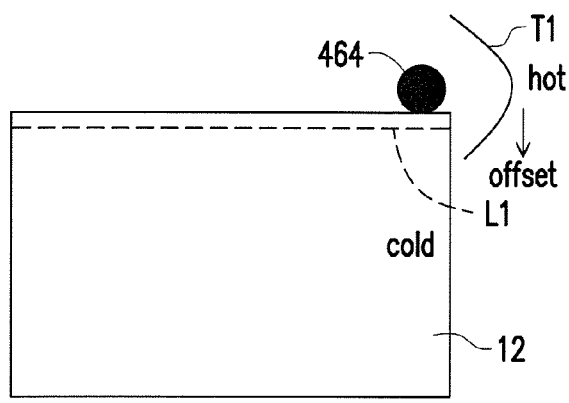
FIG. 8 is a schematic view showing the principle of hot cracking applied when modifying the edge of the brittle layer in the step 130 in FIG. 1.

FIG. 8 is a schematic view showing the principle of hot cracking applied when modifying the edge of the brittle layer 12 in the step 130 in FIG. 1. Referring to FIGS. 1 and 8, when the focus 464 of the laser beam B3 is formed near the edge of the brittle layer 12, a temperature gradient T1 is formed. The position on the brittle layer 12 near the focus 464 is hot, and the position on the brittle layer 12 away from the focus 464 is cold. The temperature difference between the two positions causes the chippings on the edge of the brittle layer 12 cracks at the dotted line L1 shown in FIG. 8. When the focus 464 moves along the edge of the brittle layer 12 from the right to the left, the chippings on the edge of the brittle layer 12 are peeled along the dotted line L1.

In this embodiment, the cold position is naturally formed on the brittle layer 12 relative to the hot position without using any cooling device, the focus 464 may move along a curved edge and the chippings are then peeled along a curved path. As a result, the edge modification process (i.e. the step S130) may be applied to various shape of the cut brittle layer 12.

In other words, the laser beam B3 generates strain area on the brittle layer 12 along the edge of the brittle layer 12, and the strain propagates chippings at the edge of the brittle layer 12 along the edge of the brittle layer 12, so as to peel off a layer of chippings at the edge of the brittle layer 12, thereby modifying the edge of the brittle layer 12.

In the cutting method of a multilayer structure containing a brittle layer in this embodiment, the edge of the brittle layer 12 is modified by a laser or a laser beam strikes the edge of the brittle layer 12 to peel off a layer of chippings at the edge of the brittle layer 12 in an improved hot cracking manner. Therefore, the edge of the brittle layer 12 is modified well, so as to achieve high cutting quality of the multilayer structure 1.

In the aforementioned steps of cutting and edge modification of the multilayer structure 1, the polymeric layer 16 and the adhesive layer 14 may be thermally transformed when they are heated by a laser, and the surface of the brittle layer 12 is easy to damage in the process, which causes the strength of the surface of the brittle layer 12 to decrease. Therefore, in this embodiment, the multilayer structure 1 is designed to overcome the above phenomena, and how to modify the edge of this structure is also described below.

Figure 9:
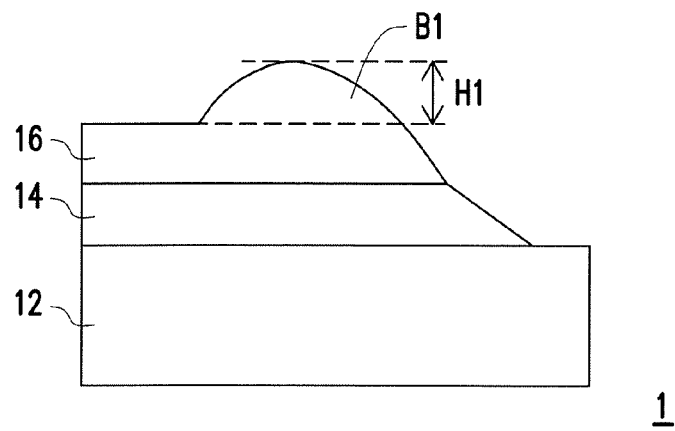
FIG. 9 is a schematic cross-sectional view showing a bump Ruined after the steps S110-S130 in FIG. 1.
Figure 10:
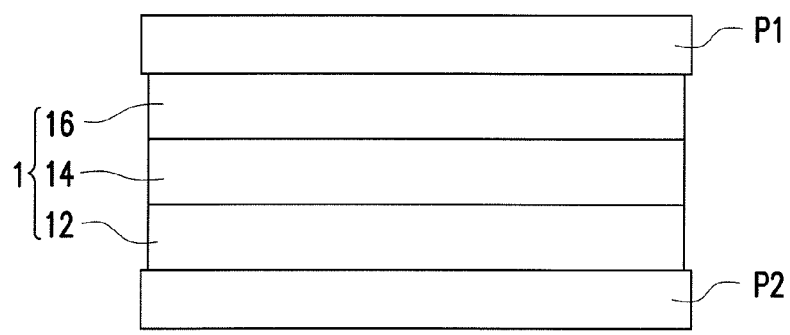
FIG. 10 is a schematic view showing the multilayer structure in FIG. 1 is further covered by protective films according to an exemplary embodiment.

FIG. 9 is a schematic cross-sectional view showing a bump formed after the steps S110-S130 in FIG. 1. A bump B1 is shown in FIG. 9, a gap may be generated due to the bump B1 when the multilayer structure 1 is assembled with another substrate. In this embodiment, at least one protective film P1, P2 may be disposed on at least one side of the multilayer structure 1 before modifying the edge of the brittle layer 12 by the laser (i.e. the step S130), or before removing the material of the multilayer structure 1 other than the brittle layer 12 (i.e. the step S120), or even before cutting the multilayer structure 1 to form the cut edge E1 (i.e. the step S110), as shown in FIG. 10.

To prevent the bump B1, a protective film P1 is added on the polymeric layer 16, so that the region of thermal transformation remains on the protective film P1. The protective films P1 and P2 are consumable materials. In an embodiment, the material of the protective films P1 and P2 may be the same as the material of the polymeric layer 16. In an embodiment, the protective films P1 and P2 are made of polyethylene terephthalate (PET), polyethylene naphthalate (PEN), polycarbonate (PC), or a combination thereof. After the process, the protective film P1 may be torn off.

Figure 11:
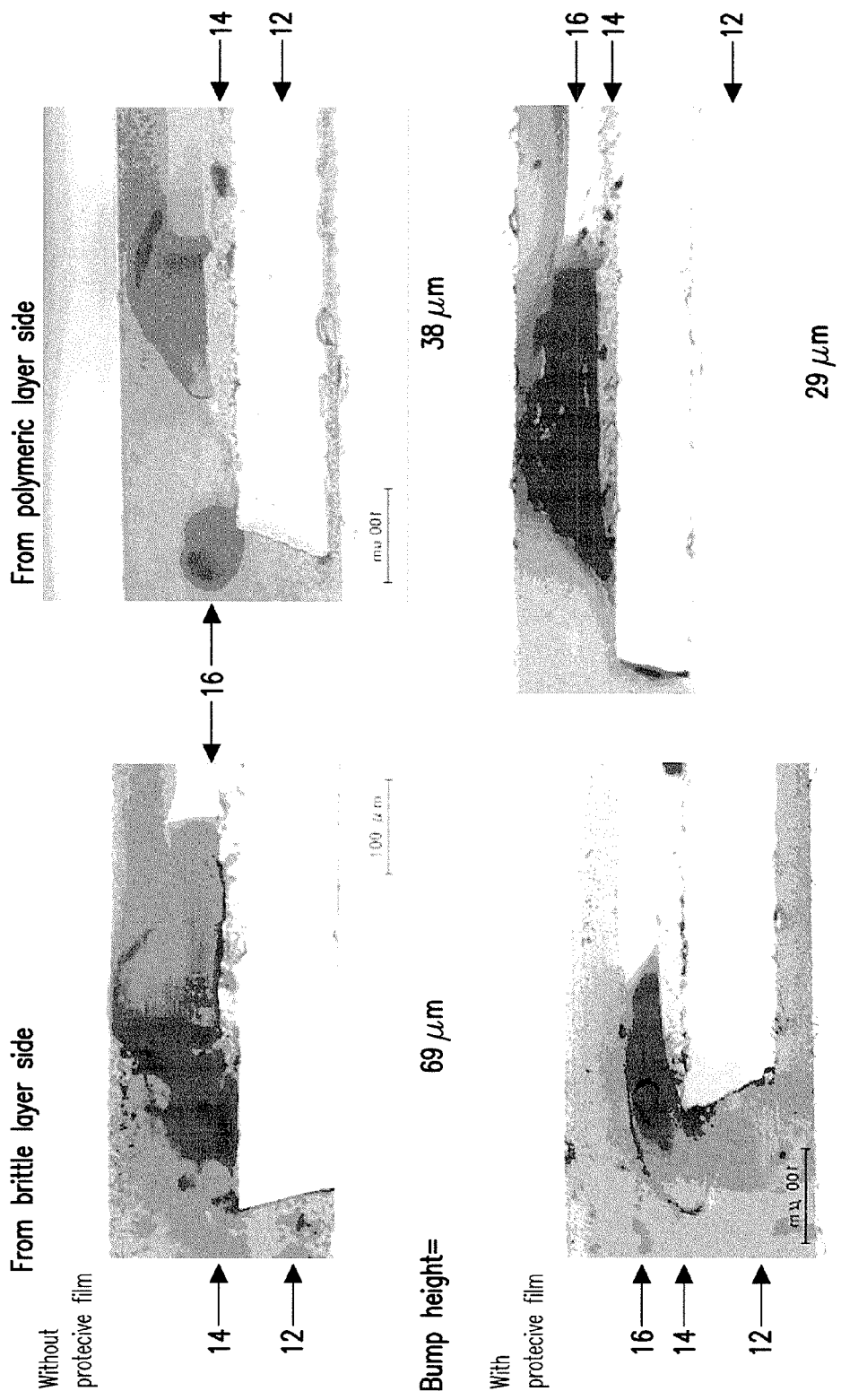
FIG. 11 shows the results of edge modification from the brittle layer side without the protective films, edge modification from the brittle layer side with the protective films, edge modification from the polymeric layer side without the protective films, and edge modification from the polymeric layer side with the protective films by the laser.

Since the rubbing or contacting a rigid object is easy to cause a thin glass surface to decrease its surface strength, a protective film P2 is added on the brittle layer 12. As a result, the surface strength is not affected, as shown in FIG. 10. The edge modification in this embodiment is the same as that in the aforementioned embodiment. In this embodiment, the difference between the results of edge modification from the brittle layer 12 side without the protective films P1 and P2, edge modification from the brittle layer 12 side with the protective films P1 and P2, edge modification from the polymeric layer 16 side without the protective films P1 and P2, and edge modification from the polymeric layer 16 side with the protective films P1 and P2 by the laser are provided and shown in FIG. 11. The edge modification from the two aforementioned sides both may remove the chippings. When the edge modification is from the brittle layer 12 side (i.e. the laser beam B3 strikes the second surface 122 of the brittle layer 12 first), since the laser beam B3 strikes and mainly heat the brittle layer 12, the heat cannot totally vaporize the polymeric layer 16 and the adhesive layer 14 behind the brittle layer 12. Consequently, after edge modification, the width of the brittle layer 12 is less than that of the polymeric layer 16.

In the case of the edge modification from the brittle layer 12 side without the protective films P1 and P2, the height H1 of the bump B1 (as shown in FIG. 9) is about 59-69 microns (see the top left view of FIG. 11), and the subsequent assembling process (i.e. the process that the multilayer structure 1 is assembled with another substrate) is adversely affected. In the case of the edge modification from the brittle layer 12 side with the protective films P1 and P2, the height of the bump is about zero (see the bottom left view of FIG. 11), and the subsequent assembling process is not adversely affected. When the edge modification is from the polymeric layer 16 side (i.e. the laser beam B3 strikes the first surface 161 of the polymeric layer 16 first), since the polymeric layer 16 and the adhesive layer 14 first receive the heat from the laser, the thermal contract is more obvious. Consequently, the width of the brittle layer 12 is greater than the polymeric layer 16. In the case of edge modification from the polymeric layer 16 side without the protective films P1 and P2, the height of the bump is about 28-38 microns (see the top right view of FIG. 11), and the subsequent assembling process is adversely affected. In the case of edge modification from the polymeric layer 16 side with the protective films P1 and P2, the height of the bump is about 19-29 microns (see the bottom right view of FIG. 11).

Figure 12:
FIG. 12 shows an inclined angle of the brittle layer after edge modification from the polymeric layer side.
Figure 13:
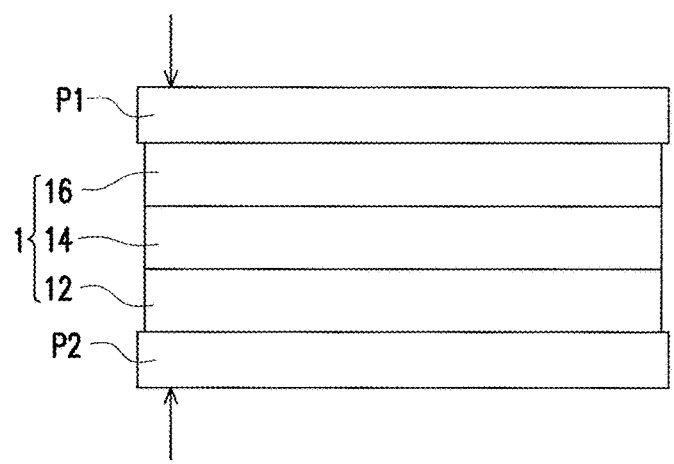
FIG. 13 is a schematic cross-sectional view showing that the laser beams strike both the top and bottom surfaces of the multilayer structure.

FIG. 12 shows an inclined angle of the brittle layer after edge modification from the polymeric layer side. Referring to FIG. 12, in the top peeling process (i.e. the edge modification from the polymeric layer 16 side), since the laser beam first strikes the top of the brittle layer 12, the temperature distributions on the top and bottom of the brittle layer 12 are different. The difference between the temperature distributions causes the edge of the brittle layer 12 to have an inclined angle as shown in FIG. 12. The inclined angle adversely affects the alignment of substrates through visual recognizing and positioning (e.g. charge coupled device (CCD) positioning). In this embodiment, the laser beams strike both the top and bottom of the multilayer structure 1 (i.e. top and bottom peeling process) as shown in FIG. 13; that is, the edge modification is performed from both the top and bottom of the multilayer structure 1, as shown in FIG. 13. In this way, the difference of the temperature distributions on the top and bottom of the brittle layer 12 is reduced. As a result, after edge modification, the edge of the brittle layer 12 is about 90 degrees with respect to the top and bottom surfaces of the brittle layer 12.

Figure 14:
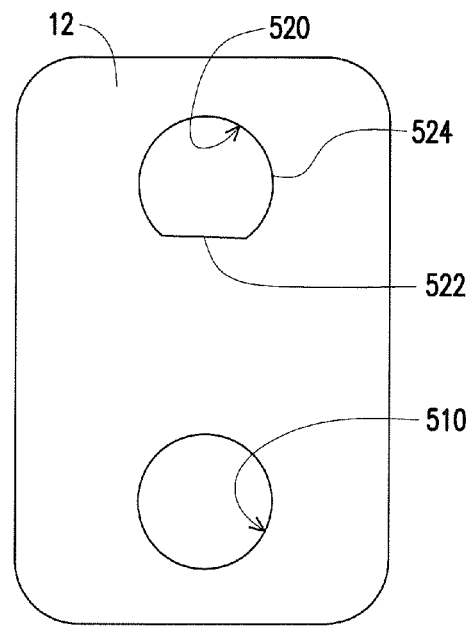
FIG. 14 shows a designed inner hole and a comparative inner hole of the brittle layer according to an exemplary embodiment.

FIG. 14 shows a designed inner hole and a comparative inner hole of the brittle layer according to an exemplary embodiment. Referring to FIG. 14, the edge modification in the exemplary embodiments belongs to hot cracking. The hot cracking is hard to be performed at a concave corner, especially for the inner hole 510 of the brittle layer 12 having a smaller radius of curvature, e.g., the radius of curvature is smaller than or equal to 5 mm. Therefore, for the inner hole 520 of the brittle layer 12 having a smaller radius of curvature, a straight path segment 522 (e.g. the length of the straight path segment 522 is 5-10 mm) in path of the laser edge modification of the inner hole 520 having a smaller radius of curvature is designed. When the laser scans the straight path segment 522, the chippings are peeled up, so as to drive the chippings at the concave corner 524 of the inner hole 520, as shown in FIG. 14.

Beside the straight path segment 522, the convex path segment can also facilitate the edge modification. Both the straight path segment 522 and the convex path segment can facilitate the edge modification. As a result, whether the laser scanning path is along an inner hole or along an outer edge (which may include a straight edge, a concave edge, a convex edge, or a combination thereof), the edge modification may start from the straight path segment 522 or the convex path segment.

Figure 15:
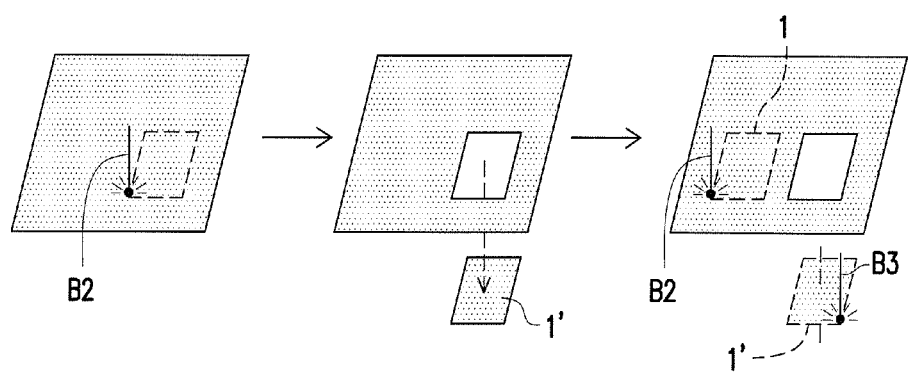
FIG. 15 is a schematic view showing that the cutting and the edge modification are integrated in one step.

FIG. 15 is a schematic view showing that the cutting and the edge modification are integrated in one step. Referring to FIG. 15, although the cutting (i.e. the step S110 in FIG. 1) and the edge modification (i.e. the step S130 in FIG. 1) are two processes, they can be implemented by the $CO_2$ laser. As a result, in a step, when cutting a shape of the multilayer structure 1 by one laser B2, the edge of another cut multilayer structure 1' may be modified by another laser B3. The period of the cutting and the period of the edge modification may be matched, so as to design the proportion of the operation periods of the respective laser heads, as shown in FIG. 15.

Figure 16A:
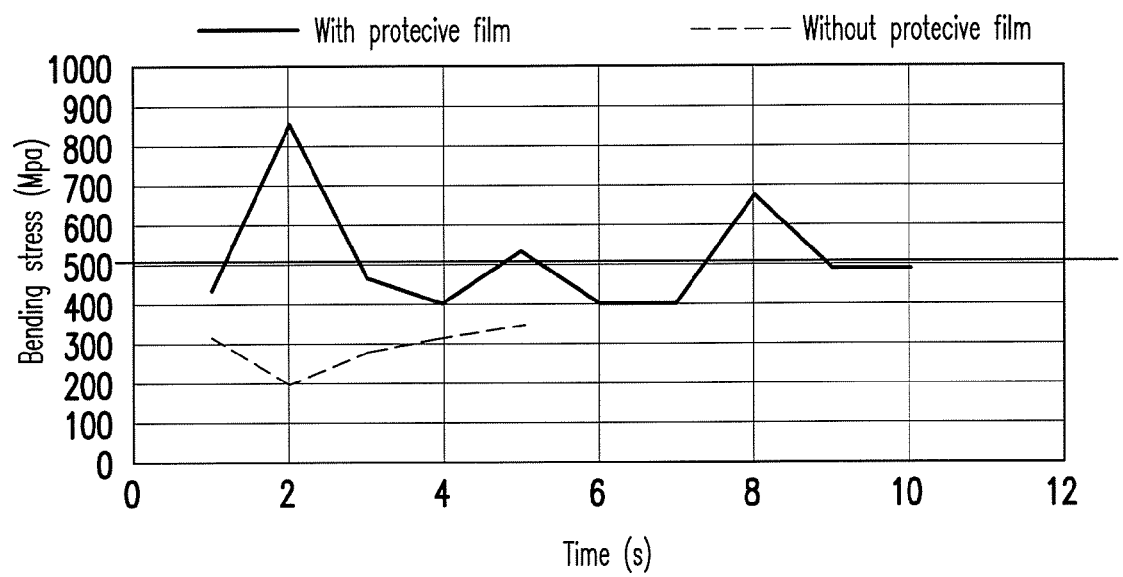
FIGS. 16A and 16B are the experiment results for the multilayer structure in FIG. 1 after edge modification is performed from the brittle layer side with and without the protective films shown in FIG. 10.
Figure 16B:
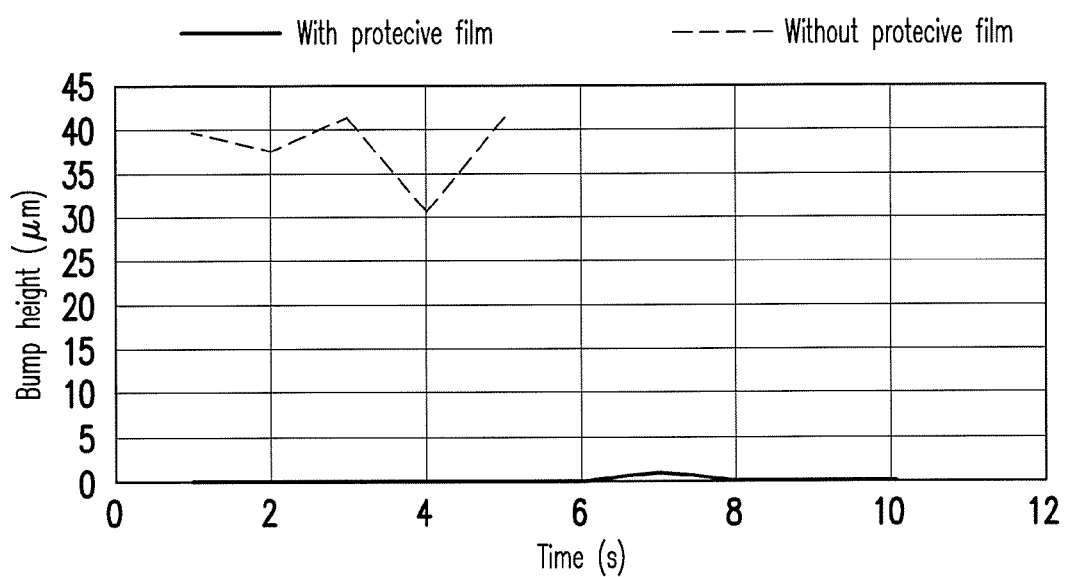

Referring to FIG. 1 again, the bending strength of the multilayer structure 1 before edge modification (i.e. the step S130) is under or about 50 MPa. Therefore, it is easy to break when it is bent. After the edge modification, the bending strength thereof can be improved over 500 MPa. FIGS. 16A and 16B are the experiment results for the multilayer structure in FIG. 1 after edge modification is performed from the brittle layer side with and without the protective films P1 and P2 shown in FIG. 10. Referring to FIGS. 1, 10, and 16, FIG. 16A shows the edge strength affected by the protective film P2. In fact, the protective film P2 may not enhance the edge strength, but may decrease the damage probability of the surface of the brittle layer 12 that reduce the strength of the surface of the brittle layer. It can be understood from the experiment result that, when the protective film P2 is not adopted, the strength of the surface of the brittle layer 12 is reduced. As a result, the maximum of the measured strength is merely about 400 MPa due to the reduced surface strength when the edge strength is measured when the multilayer structure 1 is bent from two point. On the other hand, when the protective film P2 is adopted, the problem that the surface strength is reduced is overcome, and the strength of the multilayer structure 1 after edge modification is about 900 MPa. That is, when the protective film P2 is adopted, the bending strength of the multilayer structure 1 is enhanced. Moreover, when the protective film P1 is adopted, the height of the bump is reduced. In an embodiment, in the case of the edge modification from the brittle layer 12 side without the protective films P1 and P2, the height of the bump is about 69 microns. In the case of the edge modification from the brittle layer 12 side with the protective films P1 and P2, the height of the bump is about zero. In the case of edge modification from the polymeric layer 16 side without the protective films P1 and P2, the height of the bump is about 38 microns. In the case of edge modification from the polymeric layer 16 side with the protective films P1 and P2, the height of the bump is about 29 microns.

When the edge modification is performed, an alignment system may be used. Specifically, in this embodiment, a control unit electrically connected to the laser source is used. The control unit is configured to seek the edge of the brittle layer 12 (e.g., by a charge-coupled device (CCD)), and control a scanning path and a scanning speed of the laser beam B3 striking on the brittle layer 12 (e.g., control the movement of the focus of the laser), and cause the laser beam B3 to strike a surface of the brittle layer 12 adjacent to the edge of the brittle layer 12 so as to peel off a layer of chippings at the edge of the brittle layer 12, thereby the edge of the brittle layer 12 is modified. The alignment system may also enhance the edge quality after edge modification, such as high edge straightness, strong bending strength or low bump height.

In conclusion, in the cutting method of a multilayer structure containing a brittle layer according to the exemplary embodiments, the edge of the brittle layer is modified by a laser or a laser beam strikes the edge of the brittle layer to peel off a layer of chippings at the edge of the brittle layer in an improved hot cracking manner. Therefore, the edge of the brittle layer is modified well, so as to achieve high cutting quality of the multilayer structure.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A cutting method of a multilayer structure containing a brittle layer, the cutting method comprising:
   cutting the multilayer structure to form a cut edge;
   removing a material of the multilayer structure other than the brittle layer along the cut edge, wherein the material of the multilayer structure other than the brittle layer has a width ranging from 1 micron to 2 millimeter; and
   modifying an edge of the brittle layer remaining after removing the material of the multilayer structure other than the brittle layer by a laser beam.

2. The cutting method according to claim 1, wherein modifying the edge of the brittle layer by the laser beam comprises:
   causing the laser beam to strike the edge of the brittle layer adjacent to the cut edge so as to peel off a layer of chippings at the edge of the brittle layer.

3. The cutting method according to claim 2, wherein the laser beam strikes at least one of a top surface and a bottom surface of the brittle layer, and the top surface and the bottom surface are arranged along a thickness direction of the brittle layer.

4. The cutting method according to claim 2, wherein a spot of the laser beam on the brittle layer satisfies $0.5 \leq b/a \leq 2$, where a is a diameter of the spot of the laser beam on a surface of the brittle layer, and b is the distance from the center of a focus of the laser beam to the edge of the brittle layer along a direction perpendicular to a thickness direction of the brittle layer.

5. The cutting method according to claim 2 further comprising:
   controlling a scanning path and a scanning speed of the laser beam striking on the brittle layer and allowing the laser beam to complete the scanning path.

6. The cutting method according to claim 5, wherein scanning of the laser beam starts at a straight path segment or a convex path segment of the scanning path.

7. The cutting method according to claim 5, wherein the scanning speed of the laser beam on a surface of the brittle layer ranges from 10 mm/s to 100 mm/s.

8. The cutting method according to claim 2, wherein an average power of the laser beam on a surface of the brittle layer ranges from 1 W to 50 W.

9. The cutting method according to claim 2, a diameter of a spot of the laser beam on a surface of the brittle layer ranges from 50 microns to 1000 microns.

10. The cutting method according to claim 1, wherein the laser beam generates an strain area on the brittle layer along the edge of the brittle layer, and a strain propagates chippings at the edge of the brittle layer along the edge of the brittle layer, so as to peel off a layer of chippings at the edge of the brittle layer, thereby modifying the edge of the brittle layer.

11. The cutting method according to claim 1, wherein the brittle layer is a glass layer or a ceramic layer.

12. The cutting method according to claim 1, wherein the multilayer structure further contains an adhesive layer and a polymeric layer, and the adhesive layer is disposed between the brittle layer and the polymeric layer, and removing the material of the multilayer structure other than the brittle layer along the cut edge comprises removing a material of the adhesive layer and a material of the polymeric layer.

13. The cutting method according to claim 1 further comprising:
disposing at least one protective film on at least one side of the multilayer structure before modifying the edge of the brittle layer by the laser.

14. The cutting method according to claim 13, wherein the protective film is made of polyethylene terephthalate (PET), polyethylene naphthalate (PEN), polycarbonate (PC), or a combination thereof.

15. The cutting method according to claim 1, wherein a wavelength of the laser beam ranges from 3 microns to 12 microns.

16. The cutting method according to claim 1, wherein a thickness of the brittle layer ranges from 1 micron to 1 millimeter.

17. The cutting method according to claim 1, wherein a size of chippings at the edge of the brittle layer formed after cutting the multilayer structure is controlled so that a width of a layer of the chippings ranges from 1 microns to 2 millimeters.

18. The cutting method according to claim 1, wherein a width of chippings at the edge of the brittle layer formed after cutting the multilayer structure is controlled to be smaller than twice a thickness of the brittle layer.

19. A cutting method of a multilayer structure containing a brittle layer, the cutting method comprising:
cutting the multilayer structure to form a cut edge; and
causing a laser beam to strike an edge of the brittle layer adjacent to the cut edge so as to peel off a layer of chippings at the edge of the brittle layer, wherein a spot of the laser beam on the brittle layer satisfies $0.5 \leq b/a \leq 2$, where a is a diameter of the spot of the laser beam on a surface of the brittle layer, and b is the distance from the center of a focus of the laser beam to the edge of the brittle layer along a direction perpendicular to a thickness direction of the brittle layer.

20. The cutting method according to claim 19, wherein the laser beam generates an strain area on the brittle layer along the edge of the brittle layer, and a strain propagates chippings at the edge of the brittle layer along the edge of the brittle layer, so as to peel off the layer of chippings at the edge of the brittle layer, thereby modifying the edge of the brittle layer.

21. The cutting method according to claim 19, wherein the brittle layer is a glass layer or a ceramic layer.

22. The cutting method according to claim 19 further comprising:
disposing at least one protective film on at least one side of the multilayer structure before causing the laser beam to strike the edge of the brittle layer adjacent to the cut edge.

* * * * *